United States Patent
Collot

(10) Patent No.: US 9,919,876 B2
(45) Date of Patent: Mar. 20, 2018

(54) MODULAR CONVEYOR SYSTEM AND CORRESPONDING METHOD

(71) Applicant: SAVOYE, Dijon (FR)

(72) Inventor: Patrick Collot, Corberon (FR)

(73) Assignee: SAVOYE, Dijon (FR)

( * ) Notice: Subject to any disclaimer, the term of this patent is extended or adjusted under 35 U.S.C. 154(b) by 295 days.

(21) Appl. No.: 14/407,888

(22) PCT Filed: Jun. 13, 2013

(86) PCT No.: PCT/EP2013/062213
§ 371 (c)(1),
(2) Date: Dec. 12, 2014

(87) PCT Pub. No.: WO2013/186288
PCT Pub. Date: Dec. 19, 2013

(65) Prior Publication Data
US 2015/0151921 A1 Jun. 4, 2015

(30) Foreign Application Priority Data
Jun. 15, 2012 (FR) ...................................... 12 55646

(51) Int. Cl.
*B65G 43/00* (2006.01)
*B65G 43/10* (2006.01)
*G05B 15/02* (2006.01)

(52) U.S. Cl.
CPC ............. *B65G 43/00* (2013.01); *B65G 43/10* (2013.01); *G05B 15/02* (2013.01)

(58) Field of Classification Search
USPC ........................................................ 700/230
See application file for complete search history.

(56) References Cited

U.S. PATENT DOCUMENTS 5,285,887 A 2/1994 Hall
2003/0168316 A1* 9/2003 Knepple ................ B65G 37/02
198/460.1

(Continued)

FOREIGN PATENT DOCUMENTS

DE 102004038135 A1 3/2005
WO 2006102691 A2 10/2006
WO 2011083783 A1 7/2011

OTHER PUBLICATIONS

International Search Report dated Nov. 21, 2013 for corresponding International Application No. PCT/EP2013/062213 filed Jun. 13, 2013.

(Continued)

*Primary Examiner* — Kyle O Logan
(74) *Attorney, Agent, or Firm* — David D. Brush; Westerman, Champlin & Koehler, P.A.

(57) ABSTRACT

A conveyor system includes successive modules forming a conveyor segment, each module includes a control device associated with, and controlling, at least one zone. Each control device includes a communication device for communicating with the control devices included in the adjacent modules. The control devices execute a mechanism for propagation and enrichment of quantitative segment information, from the two end zones of the conveyor segment, thereby providing for each zone: a first quantitative segment information item (propagated and enriched from upstream to downstream and relating to all of the zones in an upstream sub-segment located upstream from the zone) and/or a second quantitative segment information item (propagated and enriched from downstream to upstream and relating to all of the zones in a downstream sub-segment located downstream from the zone). Each control device dynami- (Continued)

cally adapts the behavior of each zone it controls, according to the available quantitative segment information.

10 Claims, 3 Drawing Sheets

(56) References Cited

U.S. PATENT DOCUMENTS

| | | | |
|---|---|---|---|
| 2005/0065641 A1* | 3/2005 | Nagai | B65G 47/261 |
| | | | 700/230 |
| 2013/0066462 A1* | 3/2013 | Serjeantson | B65G 43/00 |
| | | | 700/225 |
| 2013/0213768 A1 | 8/2013 | Yokoya et al. | |

OTHER PUBLICATIONS

English translation of the Written Opinion dated Dec. 15, 2014 for corresponding International Application No. PCT/EP2013/062213 filed Jun. 13, 2013.

* cited by examiner

MODULAR CONVEYOR SYSTEM AND CORRESPONDING METHOD

1. CROSS-REFERENCE TO RELATED APPLICATIONS

This application is a Section 371 National Stage Application of International Application No. PCT/EP2013/062213, filed Jun. 13, 2013, the content of which is incorporated herein by reference in its entirety, and published as WO 2013/186288 on Dec. 19, 2013, not in English.

2. FIELD OF THE INVENTION

The field of the invention is that of the conveyance or conveying of isolated, heavy or light loads.

More specifically, the invention relates to a modular conveyance or conveying system, i.e. a conveying system comprising a plurality of successive modules, assembled in a determined sequence and forming a conveying section. Each module comprises a control device and at least one zone associated with and controlled (or driven) by the control device. Each control device included in a given module comprises means of communication with the control devices included in the modules placed on either side of the given module in the sequence. Each zone comprises at least one actuator receiving a command signal coming from the associated control device and at least one sensor sending a signal of presence towards the associated control device.

The invention can be applied especially but not exclusively in the field of production or of logistics.

3. TECHNOLOGICAL BACKGROUND

Modular conveying systems are used especially but not exclusively to implement a zero-pressure accumulation or ZPA type conveying. ZPA conveying is used when the loads (parcels) to be transported should not touch each other (because of fragility, accumulation in the curves, etc). The conveying system (also called a conveyor) is then divided into different zones, each of them containing only one load. These zones are all independent and release a load when the following zone is free. In general, each zone integrates its own motor-drive (actuating) and detection system.

Figure 1:
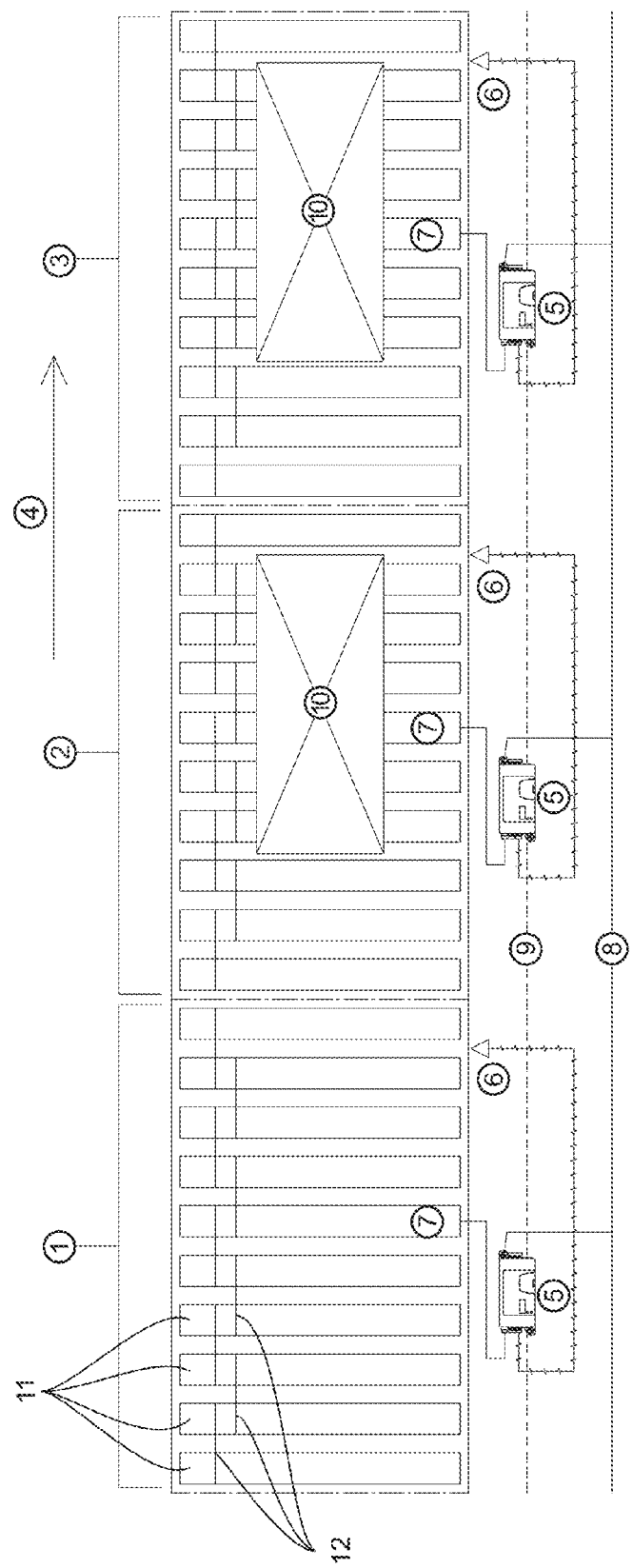

Referring now to FIG. 1, a description is provided of a prior-art solution of a modular conveying system, proposed by the firm Interroll. The loads (parcels) are referenced 10. The arrow referenced 4 indicates the conveying direction. In the example of FIG. 1, the conveying system (or conveyor) comprises three modules. Each module has a zone 1, 2 or 3 controlled by the control module 5 (called "ZoneControl"). Each zone has a drive roller 7, a sensor 6, slave rollers 11 (driven in cascade by the drive roller via transmission belts 12). The control devices 5 are connected to one another via connections 9, for example of the P2P (peer-to-peer) bus type, in order to exchange starting signals, each control device 5 communicating firstly with an upstream control device and secondly with a downstream control device (see example of operation here below). Each control device 5 is also connected to a power supply cable 8. Each control device 5 sends a command signal to the actuator 7 of the zone that it controls and receives a presence signal coming from the sensor 6 of the zone that it controls. Each control device 5 comprises means of configuration (in the form of DIP switches) enabling the configuration of the parameters of the conveying function carried out by the controlled zone and especially the conveying speed of the controlled zone, the direction of rotation of the drive roller of the controlled zone, the logic for the ZPA conveying (individual process or group processing (train mode)).

The working of the system of FIG. 1 is for example the following:

- the control device of the zone 3 receives a starting signal: it actuates the drive roller 7 of the zone 3 so that the first parcel 10 leaves the zone 3 (and hence the conveyor);
- the control device of the zone 2 receives a starting signal coming from the control device of the zone 3. It actuates the driven roller 7 of the zone 2 so that the second parcel 10 passes from the zone 2 to the zone 3;
- the control device of the zone 3 receives a starting signal: it actuates the drive roller 7 of the zone 3 so that the second parcel 10 leaves the zone 3 (and hence the conveyor).

The prior-art solution of modular conveying systems described in detail here above, has several drawbacks, and especially:

- the decentralizing of the control is not optimal. Indeed, each control device controls a zone according to the command signals (starting signals) that it receives from one of the two control devices with which it is connected. But each control device is not capable of dynamically adapting the controlling of its zone. The two control devices with which it is connected do not send it information enabling such a dynamic adaptation (there is no information on upstream or downstream sub-sections situated on either side of the controlled zone);
- it does not provide for a simple way of making available information on the entire section (for example the conveyor filling rate). To an even greater extent, it does not enable such section information to be communicated out of the section, i.e. to one or more other sections or again to a computerized supervision system (for example of the WCS (warehouse control system), WMS (warehouse management system), control screens, etc) types;
- it does not enable the transit, at the same time as the loads are transported from one end to the other of the section, of the tracking information associated with these loads;
- in terms of behavior (i.e. of function), it enables the configuration (by DIP switches) of only the parameters of the conveying function carried out by the controlled zone (parameters indicating for example that the conveying function is of the ZPA "step by step" type). There is no choice on the nature of the function: only one function among conveying functions (that can be parameterized) is proposed; no other specific function (for example a order-preparing station function or a labeling station function) is proposed;
- it enables the configuration of the conveying speed (overall speed or that of the controlled zone) but it does not enable the control device to adapt set values of operation which are possibly indexed on this conveying speed (for example a set value for declaring a "jamming" type malfunction;
- the control devices get installed on a conveying system (or conveyor) already constituted mechanically. In other words, each control device is not pre-assembled with a zone to form a pre-assembled module among a limited number of standard pre-assembled modules. This does not greatly facilitate the migration of a module towards a novel architecture (reutilization, recycling, retrofitting).

4. SUMMARY OF THE INVENTION

One particular embodiment of the invention proposes a system of conveying comprising successive modules assembled according to a determined sequence and forming a conveying section, each module comprising a control device and at least one zone associated with and controlled by the control device, each control device included in a given module comprising means of communication with the control devices included in the modules placed on either side of the given module in the sequence, each zone comprising at least one actuator, receiving a command signal coming from the associated control device and at least one sensor sending a signal of presence to the associated control device. The control devices comprise means for executing a mechanism of propagation and enhancement (or augmentation) of section information, from one zone to the next between zones, starting from the two end zones of the conveying section, making it possible, for each zone, to have available section information on upstream and downstream sub-sections, situated on either side of said zone. Each control device comprises means of dynamic adaptation of the behavior of each zone that it controls, as a function of the section information that it has available through the mechanism of propagation and enhancement.

In other words, the control devices include means for executing a mechanism of propagation and enhancement of quantitative information on sections, from one zone to the next between zones and by incrementation of a counter for each piece of quantitative information, starting from the two end zones of the conveying section, making it possible, for each zone, to have available at least one first piece of quantitative section information, propagated and enhanced (or augmented) from upstream to downstream and relative to all the zones of an upstream sub-section situated upstream to said zone and/or at least one second piece of quantitative section information, propagated and enhanced from downstream to upstream and relative to all the zones of a downstream sub-section situated downstream to said zone. Each control device comprises means of dynamic adaptation of the behavior of each zone that it controls, as a function of said at least one first piece of quantitative section information and/or said at least one second piece of quantitative section information that it has available for said zone through the mechanism of propagation and enhancement.

The general principle of the invention therefore consists in decentralizing the control to bring it as close as possible to the actuators in the zones. This particular embodiment of the invention relies on a wholly novel and inventive approach with the implementation by the control devices of a mechanism of propagation and enhancement of section information, from one zone to the next between zones (two consecutive zones being controlled either by the same control device or by two consecutive control devices).

Thus, for each zone, there is information available on upstream and downstream sub-sections situated on either side of this zone. The control device which drives this zone can dynamically adapt the control according to this information.

The decentralization of the control makes it possible to anticipate the phases of tests on the client site. Once a module is supplied with energy, it becomes functional without any need for any logic information on starting.

In other words, at the two end zones of the section, there is therefore information available on the entire section.

According to one particular characteristic, for each zone, the segment information on each upstream or downstream sub-section situated on either side of said zone (i.e. said at least one first piece of quantitative section information and said at least one second piece of quantitative section information) belong to the following group comprising:
  the number of modules included in the sub-section;
  the number of zones included in the sub-section;
  the number of free zones included in the sub-section;
  the number of adjacent free zones included in the sub-section;
  the number of empty zones included in the sub-section;
  the number of reserved zones included in the sub-section;
  the number of zones with jamming malfunctions included in the sub-section;
  the number of loads present in the sub-section;
  the number of loads pending at the end of the sub-section;
  the number of loads present on the adjacent zone of the sub-section;
  the number of actuators operating in the sub-section;
  the number of actuators in starting phase in the sub-section.

This list is not exhaustive.

According to one particular characteristic, the means of dynamic adaptation of the behavior of a given zone act on at least one parameter belonging to the group comprising:
  the speed of conveying of the given zone;
  the total number, for the conveying section, of zones whose actuator is in starting phase;
  the total number, for the conveying section, of zones for which the actuator is in operation.

This list is not exhaustive.

According to one particular characteristic, the means of dynamic adaptation of the behavior of a given zone act on the speed of conveying of the given zone and on at least one parameter of operation which is dependent on said speed of conveying.

In this way, not only does the control device decide alone on how to adapt the speed of conveying a zone that it is controlling but it also calculates and adapts the operating parameters (set values of safety especially) related to the new speed of conveying.

According to one particular characteristic, the control devices comprise means for executing a mechanism for propagating load tracking information, from one zone to the next between zones, making it possible to obtain the transit, between the two end zones of the conveying section, of tracking information on the loads transported by the system.

Thus, the control devices obtain the transit, at the same time as the loads, of tracking information associated with these loads.

According to one particular characteristic, each control device comprises means of configuration enabling the following to be defined for each controlled zone:
  one function, among a conveying function and at least one specific function, related to the nature of the apparatus or apparatuses, including said at least one actuator, included in said controlled zone; and
  nominal parameters of operation associated with said function, including a nominal speed of conveying.

In this way, it is possible to use standard modules chosen from among a limited number of distinct modules (forming a library). A choice is proposed on the very nature of the function: conveying function or else another specific function.

According to one particular characteristic, said at least one specific function belongs to the group comprising:
  an order-preparing station function;
  a load-reintroducing station function;

a labeling station function;

a checking station function (quality, weight, template, etc).

This list is not exhaustive.

According to one particular characteristic, each module is a pre-assembled set available before installation of the system on an operations site.

Thus, each control device is pre-assembled with one or more zones to form a pre-assembled module. Advantageously, the invention uses a limited number of standard, pre-assembled modules (this number depends essentially on the number of zones, of which the apparatuses, especially the actuators, are distinct. This facilitates the migration of a module towards a novel architecture (reutilization, recycling, retrofitting).

Another embodiment of the invention proposes a control device adapted to being integrated into a given module of a conveying system comprising successive modules assembled in a determined sequence and forming a conveying section, the given module comprising, in addition to the control device, at least one zone associated with and controlled by the control device, the control device comprising means of communication with the control devices included in the modules placed on either side of the given module in the sequence, each zone controlled by the control device comprising at least one actuator, receiving a command signal coming from the control device and at least one sensor sending a signal of presence to the control device. Said control device comprises:

means of execution of a mechanism of propagation and enhancement of section information, from one zone to the next between zones, starting from the two end zones of the conveyor section, making it possible to have available, for each zone, section information relative to upstream and downstream sub-sections situated on either side of said zone; and means of dynamic adaptation of the behavior of each zone that it controls, as a function of the section information that it has available through the mechanism of propagation and enhancement.

Another embodiment of the invention proposes a Method for managing a system of conveying comprising successive modules assembled in a determined sequence and forming a conveying section, each module comprising a control device and at least one zone associated with and controlled by the control device, each control device included in a given module comprising means of communication with the control devices included in the modules placed on either side of the given module in the sequence, each zone comprising at least one actuator receiving a control signal coming from the associated control device and at least one sensor sending out a signal of presence to the associated control device. Each of the control devices carries out:

a mechanism of propagation and enhancement of section information, from one zone to the next between zones, starting from the two end zones of the conveyor section, making it possible to have available, for each zone, section information relative to upstream and downstream sub-sections situated on either side of said zone; and a dynamic adaptation of the behavior of each zone that it controls, as a function of the section information that it has available through the mechanism of propagation and enhancement.

In other words, each of the control devices carries out:

a mechanism of propagation and enhancement of quantitative section information, from one zone to the next between zones, and by incrementation of a counter for each piece of quantitative information, starting from the two end zones of the conveying section, making it possible to have available for each zone:

at least one first piece of quantitative section information propagated and enhanced from downstream to upstream and relative to all the zones of an upstream sub-section, situated upstream to said zone; and at least one second piece of quantitative section information propagated and enhanced from upstream to downstream and relative to all the zones of a downstream sub-section situated downstream to said zone; and a dynamic adaptation of the behavior of each zone that it controls, as a function of said at least one first piece of quantitative section information and/or said at least one second piece of quantitative section information, that it has available for said zone through the mechanism of propagation and enhancement.

Another embodiment of the invention proposes a computer program product that comprises program code instructions for the implementing of the above-mentioned method (in any one of its different embodiments), when said program is executed on a computer.

Another embodiment of the invention proposes a computer-readable and non-transient storage medium storing a computer program comprising a set of instructions executable by a computer to implement the above-mentioned method (in any one of its different embodiments).

5. LIST OF FIGURES

Figure 2:
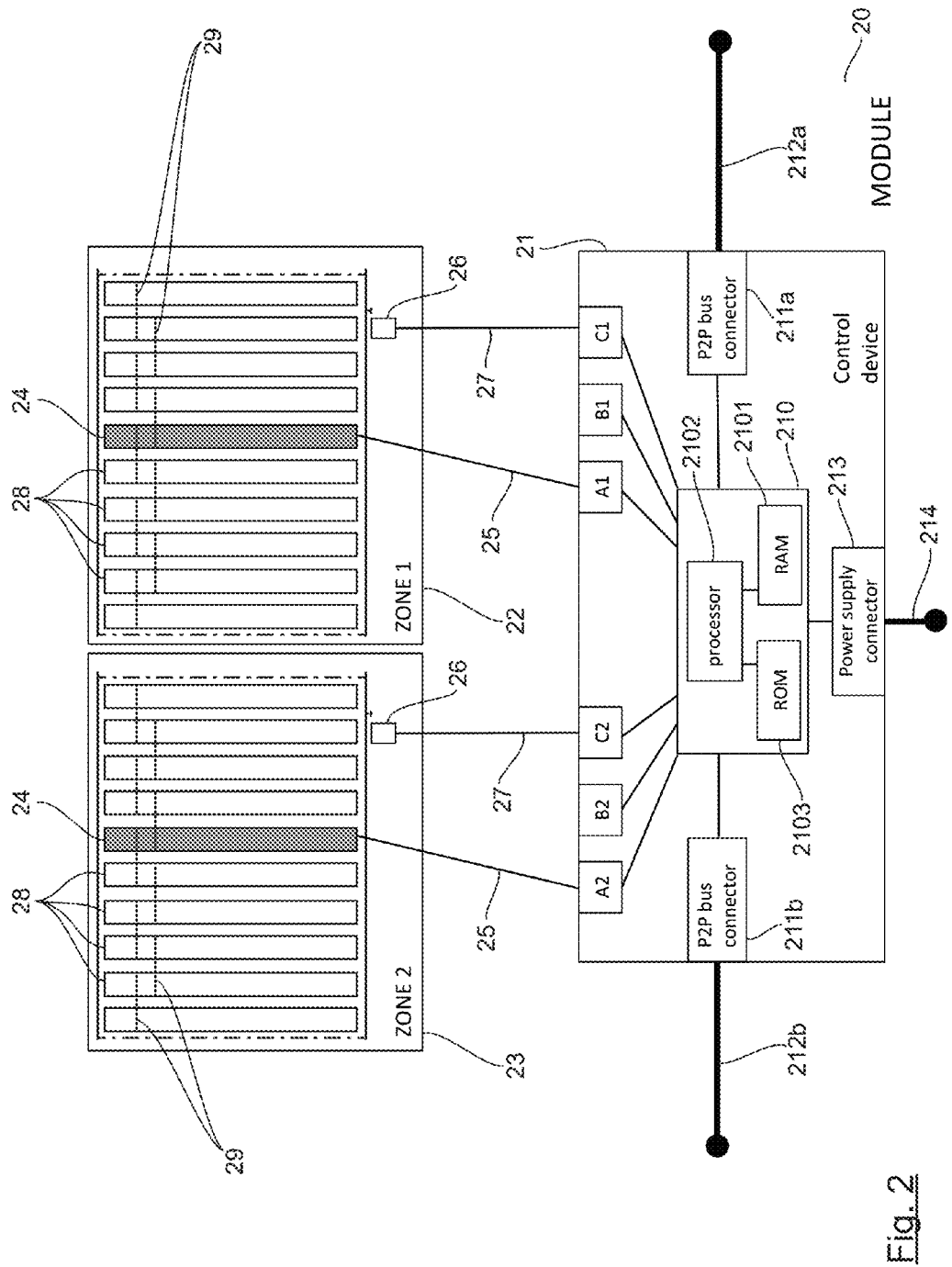
Figure 3:
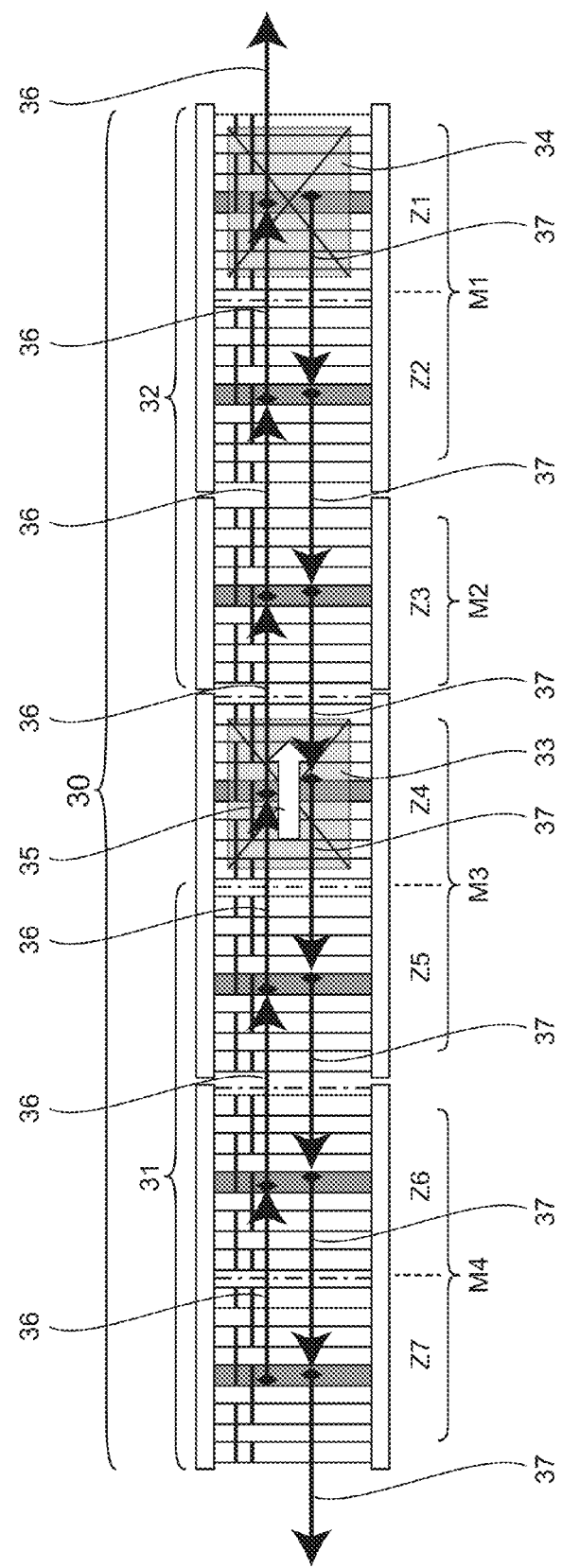

Other features and advantages of the invention shall appear from the following description, given by way of an indicative and non-exhaustive example and from the appended drawings, of which:

FIG. 1, already described with reference to the prior art, presents a block diagram of an example of a known system;

FIG. 2 presents a block diagram according to one particular embodiment of the invention; and FIG. 3 presents a block diagram of a system according to one particular embodiment of the invention.

6. DETAILED DESCRIPTION

In all the figures of the present document, the identical elements and steps are designated by a same numerical reference.

Referring now to FIG. 2, we present a module 20 according to one particular embodiment of the invention.

The module 20 is a double module comprising a control device 21 and two zones 22, 23 (also denoted as "zone 1" and "zone 2") associated with and controlled by the control device 21.

Each zone 22, 23 comprises:

a drive roller (actuator) 24 receiving, through a link 25, a command signal coming from the control device 21;

slave rollers 28, driven in cascade by the drive roller 24 via transmission belts 29; and a sensor 26 sending, via a link 27, a presence signal 27 towards the control device 21.

In variants, each zone can include several actuators (instead of only one) and one or more sensors (instead of only one).

The control device 21 comprises:

a control unit 210 (see detailed description here below);

two bus connectors 211*a*, 211*b*, each enabling a connection with another control device via a P2P bus 212*a*, 212*b*;

a power supply connector 213 connected to a power supply cable 214 enabling the supply of energy to the control device 21 as well as the drive roller (actuator) 24 and a sensor 26;

for each of the two controlled zones 22, 23:

a connector A1, A2 to which there is connected the link 25 conveying the control signal for the drive roller 24;

a connector C1, C2 to which there is connected the link 27 conveying the presence signal coming from the sensor 26;

means of configuration B1, B2 (made for example in the form of DIP switches).

In one variant, the configuration of each zone is made by means of configuration messages received via the P2P bus (212*a*, 212*b*).

For each controlled zone, the configuration means B1, B2 enable the definition of:

one function, from among a classic conveying function ("ZPA", "step by step") and at least one specific function, related to the nature of the apparatus or apparatuses (drive roller 24, slave rollers 28, etc) included in the controlled zone; and nominal operating parameters associated with this function, including a nominal conveying speed.

The term "specific function" is understood to mean a function other than a classic conveying function, such as for example an order-preparing station function, a load-reintroduction station function, a labeling station function, a checking station function (quality, weight, template, etc).

To define a specific function of a given zone, the configuration means define for example:

the equipment of this given zone (drive roller conveyor, curved roller conveyor, conveyor belts, hinged telescopic conveyors, removable telescopic conveyors, static or dynamic weighing conveyor, etc); and the operation (predefined behavior of these apparatuses (examples of operation: online workstation operator, operating station reintroduction zone, accumulation management zone for manual reintroduction, labeling station, template control station, etc).

Since a module can contain two zones, the position of the functions is for example specified in the program executed by the control unit and defined relatively to the normal direction of forward progress of the conveyor (arrow referenced 35 in FIG. 3).

The configuration of each behavior in speed includes the configuration of the nominal conveying speed and of the associated operating parameters. It is for example possible, with a DIP switch, to choose from among five sets of predefined settings (each setting corresponds to a predefined rate of operation, making it possible to achieve conveying at a standard rate of 10 l/min to 60 l/min—l/min signifying "loads per minute").

In one variant, the set value of speed as well as the associated main settings can be modified via the P2P bus to meet specific operating constraints. The instructed values can be applied to one particular zone or to the entire segment (i.e. to all the zones constituting it).

In one particular implementation, the configuration means B1, B2 comprise a particular switch used to define the conveying direction. In one variant, the conveying direction can be reversed by a piece of information on the P2P bus. It will be noted that the function of each of the zones is not influenced by the reversal of the direction of movement of the articles (an operator's workstation does not physically change its place if the direction of forward progress of the articles changes).

It must be noted that the addition or withdrawal of modules within the conveying system does not necessitate any reconfiguration, since the propagated information is automatically updated. There is no limit on defined segment length.

Optionally, it is possible to plan for a validation of auto-addressing of the zones on the P2P bus via a command on the same bus if it is desired to use it to individually modify the parameters of operation of the zones. It must be noted that the addressing is done by the zones or not done on the control cards which enable individual access to each zone (individual control of a zone).

In the example of FIG. 2, the control unit 210 comprises a processor 2102 or CPU, a RAM 2101 and a ROM 2103 storing a computer program. At initialization, the instructions of the code of the computer program are for example loaded into the RAM 2101 and then executed by the processor 2102. The working of the control unit 210 is described in detail here below with reference to FIG. 3.

FIG. 2 illustrates only one particular way, among several possible ways, of carrying out the different algorithms executed by the control unit 210. Indeed, the control unit 210 can be set up equally well on a reprogrammable computing machine (a PC computer, a DSP processor or a microcontroller) executing a program comprising a sequence of instructions or on a dedicated computation machine (for example a set of logic gates such as an FPGA or an ASIC or any other hardware module). Should the control unit 210 be implanted in a reprogrammable computation machine, the corresponding program (i.e. the sequence of instructions) could be stored in a storage medium that is detachable (such as for example a floppy disk, a CD ROM or a DVD ROM) or not detachable, this storage medium being partially or totally readable by a computer or a processor.

In one variant (not shown because it can be easily and directly deduced from the example of FIG. 2), the module is a simple module comprising a control device and only one zone (for example the one referenced 22 in FIG. 2). The control device is distinguished from the one referenced 21 in FIG. 2 in that it comprises no connectors referenced A1, B2 and C2 and in that the algorithms that it executes (see description of FIG. 3) are used to control only one zone.

In yet another variant (not shown because it can be easily and directly deduced from the example of FIG. 2), the module is a multiple module comprising a control device and N zones, with N being greater than or equal to three. The control device is distinguished from the one referenced 21 in FIG. 2 in that it comprises a set of connectors A, B and C (identical to the connectors A1, B1 and C1) for each of the controlled zones, and in that the algorithms it executes do not serve to control the N zones.

Each module (whether it is a single, double or multiple module as defined here above) is preferably a pre-assembled set available before installation of the complete system (comprising several modules) on an operating site.

In short, each module can manage one or more conveying zones. These modules can be likened to autonomous machines possessing their own mechanical structure, their own electrical distribution, their own sensors and actuators and their own control unit (electronic control card or API). These modules get connected to one another by means of electrical connectors and communicate with one another as soon as they are connected without special configuration (i.e. they are "plug & play" devices).

Since these modules are standard modules that can be parameterized, it is not necessary to have localized the specific functions before launching the manufacture of the hardware and it is easy to shift one specific function during the service life of the installation (for example a workstation assigned to one conveyor zone "n" can be shifted to any other zone without any major mechanical or electrical modification). On the same basis, a new workstation can be added at any place of the installation and at any time.

Referring now to FIG. 3, a system is presented according to one particular embodiment of the invention.

In this example, the conveying system 30 comprises a plurality of successive modules (denoted M1 to M4) assembled according to a determined sequence and forming a conveying section:

the module M1 is a double module, the control device of which controls the zones Z1 and Z2 (this module M1 corresponds to the one described in detail further above, with reference to FIG. 2);

the module M2 is a single module, the control device of which controls a zone Z3;

the module M3 is a double module, the control device of which controls the zones Z4 and Z5;

the module M4 is a double module, the control device of which controls the zones Z6 and Z7.

This example shows two loads (parcels) 33, 34, present in zones Z1 and Z4 respectively. The arrow referenced 35 indicates the conveying direction.

A detailed description is now provided of the algorithms executed by the control devices (and more specifically their control units 210) included in the modules M1 to M4. Purely for the sake of simplicity, the control device (referenced 21 in FIG. 2) included in each of the modules M1 to M4 has not been shown in FIG. 3.

Here below, we describe the following three algorithms executed by the control unit of each of the control devices:

mechanisms of propagation and enhancement of section information;

dynamic adaptation of behavior of each controlled zone;

mechanisms of propagation of load tracking information.

These algorithms carry out a management by zones including, for each zone, a management of interactions and communications with the adjacent zones. It may be recalled that two adjacent zones are controlled: either by the same control device which, in this case, manages the interactions and communications between the two zones internally; or by two control devices, which together manage (each for one of the two zones) the interactions and communications between the two zones.

Mechanism of Propagation and Enhancement of Section Information

Within the control devices, the control units execute a mechanism of propagation and enhancement of section information (for example by the incrementation, for each piece of information, of a counter included in a message) from one zone to the next between zones Z1 to Z7, starting from the two end zones Z1 and Z7 of the conveying section 30. This mechanism enables each control unit to have available, for each zone that it controls, section information on each of the upstream and downstream sub-sections, situated on either side of this zone.

By way of an example, we consider the zone Z4 which, like the zone Z5, is included in the double module M3 and is therefore managed by the control unit included in the control dev of this module M3. For this zone Z4, the upstream sub-section 31 comprises the zones Z7, Z6 and Z5, and the downstream sub-sections 32 comprise the zones Z3, Z2 and Z1. It is recalled that the arrow referenced 35 indicates the conveying direction.

The arrows referenced 36 symbolize the propagation and enhancement of section information, from upstream to downstream, i.e. from the zone Z7 up to the zone Z1, and even beyond the zone Z1, for example towards another downstream section (not shown) or towards a computerized supervision system (not shown).

The arrows referenced 37 symbolize the propagation and enhancement of section information, from downstream to upstream, i.e. from the zone Z1 up to the zone Z7, and even beyond the zone Z7, for example towards another upstream section (not shown) or towards a computerized supervision system (not shown).

For each zone, the section information comprises for example the following (non-exhaustive list):

the number of modules included in the upstream sub-section;

the number of modules included in the downstream sub-section;

the number of zones included in the upstream sub-section;

the number of zones included in the downstream sub-section;

the number of free zones included in the upstream sub-section;

the number of free zones included in the downstream sub-section;

the number of adjacent free zones included in the upstream sub-section;

the number of adjacent free zones included in the downstream sub-section;

the number of empty zones included in the upstream sub-section;

the number of empty zones included in the downstream sub-section;

the number of reserved zones included in the upstream sub-section;

the number of reserved zones included in downstream sub-section;

the number of zones with a jamming malfunction in the upstream sub-section;

the number of zones with a jamming malfunction in the downstream sub-section;

the number of loads present in the upstream sub-section;

the number of loads present in the downstream sub-section;

the number of loads waiting at the end of the upstream sub-section;

the number of loads waiting at the end of the downstream sub-section;

the number of loads present in the zone adjacent to the upstream sub-section;

the number of loads present in the zone adjacent to the downstream sub-section;

the number of actuators (drive rollers) working in the upstream sub-section;

the number of actuators working in the downstream sub-section;

the number of actuators in starting phase in the upstream sub-section;

the number of starting phase actuators in the downstream sub-section.

Here above, the following definitions are used: an empty zone is a zone containing no load; an free zone is a zone that is not empty but the load of which is passing to an adjacent zone; a reserved zone is a zone that can allow a load to pass in transit through it without being able to store it (stop it).

It will be noted that, for the upstream end zone Z7, the information on its downstream sub-section is information on the entire section 30. Similarly, for the downstream end zone Z1, the information on its upstream sub-section is information on the entire section 30.

Dynamic Adaptation of the Behavior of Each Controlled Zone

Within the control devices, each control unit dynamically adapts the behavior of each zone that it controls, according to the section information that it has available (through the above-mentioned mechanism of propagation and enhancement).

The section information can be used directly or in derived form. In the latter case, the invention uses information derived from the section information, such as for example the segment filling rate (given by the ratio between the number of loads present in the section and the number of zones forming the section).

The dynamic adaptation of the behavior of a given zone consists for example in acting on one or more of the following parameters (this is a non-exhaustive list):
- the speed of conveying of the given zone, and one or more parameters of operation that depend on the speed of conveying;
- the total number, for the conveying section, of zones whose actuator (drive roller) is in starting phase;
- the total number, for the conveying section, of zones whose actuator is operating.

The dynamic modification of the speed of conveying (for example at the nominal speed of conveying resulting from the configuration described here above) influences the parameters of operation that are dependent on it. For example, if the set value for declaring a "jamming" type of malfunction is positioned at 1 s at 1 m/s (nominal conveying speed), the reduction of the conveying speed to 0.5 m/s will automatically make this set value of safety go to 2 s, to comply with the consistency of the control and not give rise to untimely malfunctions.

In the example of FIG. 3, it is assumed that a parcel 34 is blocked at the downstream end of the conveyor 30, in the zone Z1. The control device (or more specifically its control unit) included in the module M3 receives a piece of information to this effect ("a load 34 is waiting at the end of the downstream sub-section 32"), and decides for example, in the light of this information, to reduce the conveying speed (speed of transfer) of the parcel 33 (presently in the zone Z4) to the zone Z3 to limit electricity consumption.

More generally, it is possible to define a set of rules on the basis of information on the section (information on the downstream and upstream sub-sections for each zone).

In other words, with all the information available at every place in the section, each control device can modify the behavior of each of the zones that it controls to carry out optimization operations such as for example:
- reducing the speed of conveying the zone if the downstream sub-section is saturated or has slowed down (limiting energy consumption and preserving electromechanical components—there is no point in transferring a load at high speed if it has to stop within two meters because the conveyor is saturated or is in the process of getting saturated);
- on the contrary, the speed of conveying of the zone can be increased if the filling rate for the downstream sub-section is low, thus reducing the transit time of the load and making a localized or one-time improvement of performance at an instantaneous rate. Examples of a situation: if a conveyor is empty because it has not been normally supplied (for example if there has been a malfunction of an upstream apparatus), the system will increase its speed until it is supplied again in order to pull the flow and favor the re-starting of the section;
- controlling and limiting the maximum number of zones being started in order to contain possible current inrush and size the electrical power supplies more efficiently;
- the number of zones under operation can itself also be controlled and limited if a reduction is accepted in the overall performance of the conveyor. For example, this "economical" mode of operation can be activated/deactivated remotely, via the P2P bus and can be applied to the entire section.

Mechanism of Propagation of Load Tracking Information

Within the control devices, the control units execute a load tracking propagation mechanism, from one zone to the next one between zones, so that tracking information on the loads 33, 34 carried by the system can travel in transit between the two end zones Z7, Z1 of the conveying section 30.

An embodiment of the present disclosure provides a system of modular conveyance offering an optimal decentralization of the control, in enabling each control device to adapt dynamically to the controlling of its zone.

An embodiment provides a simple way of having information available on the entire section (for example the conveyor filling rate).

An embodiment provides a system of this kind that can be formed by assembling standard modules, chosen from among a limited number of distinct modules (forming a library). The standardizing of the conveying modules is aimed at reducing the overall costs, the time taken for design, manufacture, delivery, implementation on the operational site and maintenance. The standardization is also aimed at facilitating the reutilization of the modules in another assembling configuration (recycling).

An embodiment provides a system of this kind for configuring the very nature of the function performed by each zone (choice between the conveying function and at least one other specific function).

An embodiment provides a system of this kind making it possible to obtain the transit, at the same time as the loads, of the tracking information associated with these loads.

Although the present disclosure has been described with reference to one or more examples, workers skilled in the art will recognize that changes may be made in form and detail without departing from the scope of the disclosure and/or the appended claims.

The invention claimed is:

1. A system of conveying a load comprising:
successive modules assembled according to a determined sequence and forming a conveying section, each module comprising a control device and at least one zone associated with and controlled by the control device, wherein each control device included in a given module is in communication with the control devices included in the modules placed on either side of the given module in the sequence, each zone comprising at least one actuator, receiving a command signal coming from the associated control device and at least one sensor sending a signal of presence to the associated control device,
wherein the control devices are configured to propagate and enhance quantitative section information, from one zone to the next between zones and increment a counter for each piece of quantitative section information, starting from the two end zones of the conveying section, providing, for each zone:
  at least one first piece of quantitative section information, propagated and enhanced from upstream to downstream and relative to all the zones of an upstream sub-section situated upstream to said zone and/or
  at least one second piece of quantitative section information, propagated and enhanced from downstream to upstream and relative to all the zones of a downstream sub-section situated downstream to said zone,
  and wherein each control device is configured to dynamically adapt a behavior of each zone that the control device controls, as a function of said at least one first piece of quantitative section information and/or said at least one second piece of quantitative section information that is provided for said zone by at least one adjacent zone.

2. The system according to claim 1, wherein, for each zone, said at least one first piece of quantitative section information and said at least one second piece of quantitative section information belong to the group consisting of:
  the number of modules included in the sub-section upstream or downstream to said zone;
  the number of zones included in the sub-section upstream or downstream to said zone;
  the number of free zones included in the sub-section upstream or downstream to said zone;
  the number of adjacent free zones included in the sub-section upstream or downstream to said zone;
  the number of empty zones included in the sub-section upstream or downstream to said zone;
  the number of reserved zones included in the sub-section upstream or downstream to said zone;
  the number of zones with jamming malfunctions included in the sub-section upstream or downstream to said zone;
  the number of loads present in the sub-section upstream or downstream to said zone;
  the number of loads pending at the end of the sub-section upstream or downstream to said zone;
  the number of loads present on the adjacent zone of the sub-section upstream or downstream to said zone;
  the number of actuators operating in the sub-section upstream or downstream to said zone;
  the number of actuators in starting phase in the sub-section upstream or downstream to said zone.

3. The system according to claim 1, wherein the dynamic adaptation of the behavior of a given zone acts on at least one parameter belonging to the group consisting of:
  the speed of conveying of the given zone;
  the total number, for the conveying section, of zones whose actuator is in starting phase;
  the total number, for the conveying section, of zones for which the actuator is in operation.

4. The system according to claim 3, wherein the dynamic adaptation of the behavior of a given zone acts on the speed of conveying of the given zone and on at least one parameter of operation which is dependent on said speed of conveying.

5. The system according to claim 1, wherein the control devices comprise means for executing a mechanism for propagating load tracking information, from one zone to the next between zones, making it possible to obtain the transit, between the two end zones of the conveying section, of tracking information on the loads transported by the system.

6. The system according to claim 1, wherein each control device comprises means of configuration enabling the following to be defined for each controlled zone:
  one function, from among a conveying function and at least one specific function, related to the nature of the apparatus or apparatuses, including said at least one actuator, included in said controlled zone; and
  nominal parameters of operation associated with said function, including a nominal speed of conveying.

7. The system according to claim 6, wherein said at least one specific function belongs to the group comprising:
  an order-preparing station function;
  a load-reintroducing station function;
  a labeling station function;
  a checking station function.

8. The system according to claim 1, wherein each module is a pre-assembled set available before installation of the system on an operations site.

9. A method comprising:
  conveying a load in a system comprising successive modules assembled in a determined sequence and forming a conveying section, each module comprising a control device and at least one zone associated with and controlled by the control device, wherein each control device included in a given module is in communication with the control devices included in the modules placed on either side of the given module in the sequence, each zone comprising at least one actuator receiving a control signal coming from the associated control device and at least one sensor sending out a signal of presence to the associated control device, and
  performing the following acts by each of the control devices:
    propagating and enhancing quantitative section information, from one zone to the next between zones, and incrementing a counter for each piece of quantitative section information, starting from the two end zones of the conveying section, providing for each zone:
      at least one first piece of quantitative section information propagated and enhanced from downstream to upstream and relative to all the zones of an upstream sub-section, situated upstream to said zone; and
      at least one second piece of quantitative section information propagated and enhanced from upstream to downstream and relative to all the zones of a downstream sub-section situated downstream to said zone; and
    dynamically adapting a behavior of each zone that the control device controls, as a function of said at least one first piece of quantitative section information and/or said at least one second piece of quantitative section information, that is provided for said zone by at least one adjacent zone.

10. A computer-readable and non-transient storage medium storing a computer program comprising a set of instructions executable by a computer to implement a method comprising:
  conveying a load in a system comprising successive modules assembled in a determined sequence and forming a conveying section, each module comprising a control device and at least one zone associated with and controlled by the control device, wherein each control device included in a given module is in communication with the control devices included in the modules placed on either side of the given module in the sequence, each zone comprising at least one actuator receiving a control signal coming from the associated control device and at least one sensor sending out a signal of presence to the associated control device, and performing the following acts by each of the control devices:

propagating and enhancing quantitative section information, from one zone to the next between zones, and incrementing a counter for each piece of quantitative section information, starting from the two end zones of the conveying section, providing for each zone:

at least one first piece of quantitative section information propagated and enhanced from downstream to upstream and relative to all the zones of an upstream sub-section, situated upstream to said zone; and at least one second piece of quantitative section information propagated and enhanced from upstream to downstream and relative to all the zones of a downstream sub-section situated downstream to said zone; and dynamically adapting a behavior of each zone that the control device controls, as a function of said at least one first piece of quantitative section information and/or said at least one second piece of quantitative section information, that is provided for said zone by at least one adjacent zone.

* * * * *

UNITED STATES PATENT AND TRADEMARK OFFICE
CERTIFICATE OF CORRECTION

PATENT NO. : 9,919,876 B2
APPLICATION NO. : 14/407888
DATED : March 20, 2018
INVENTOR(S) : Collot Page 1 of 1

It is certified that error appears in the above-identified patent and that said Letters Patent is hereby corrected as shown below:

On the Title Page
Item [74] Attorney, Agent, or Firm - delete "Westerman", insert --Westman--.

Signed and Sealed this
Nineteenth Day of March, 2019

Andrei Iancu
*Director of the United States Patent and Trademark Office*